Oct. 7, 1924.   
H. O. WILSON  
SCOOTER  
Filed Oct. 5, 1923
1,511,151
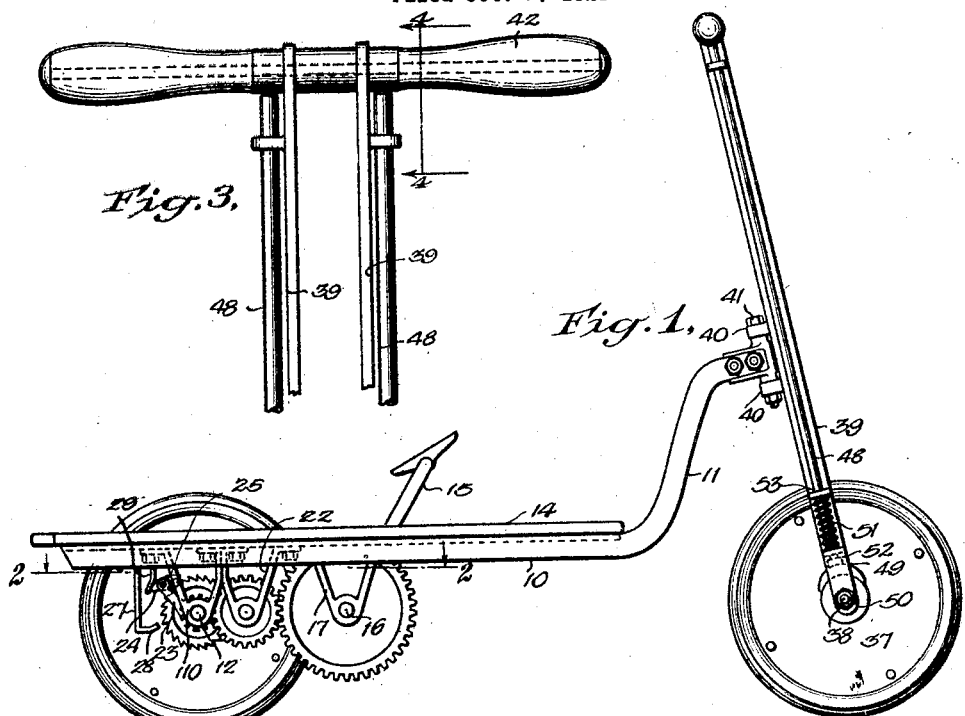
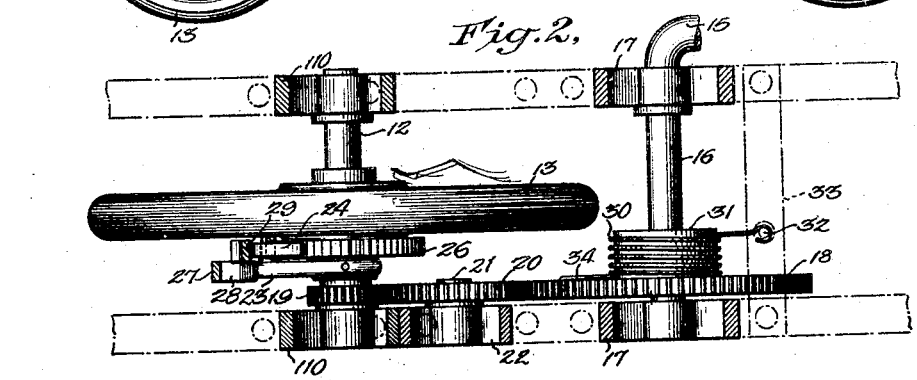
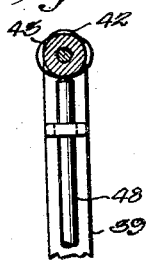
WITNESSES
INVENTOR  
HARVEY O. WILSON  
BY  
ATTORNEYS Patented Oct. 7, 1924.

1,511,151

UNITED STATES PATENT OFFICE.

HARVEY O. WILSON, OF WILMINGTON, DELAWARE.

SCOOTER.

Application filed October 5, 1923. Serial No. 666,776.

*To all whom it may concern:*

Be it known that I, HARVEY O. WILSON, a citizen of the United States of America, and a resident of Wilmington, in the county of New Castle and State of Delaware, have invented a new and Improved Scooter, of which the following is a description.

My invention relates to a scooter and is more particularly designed for embodiment in a scooter of the general type illustrated in an application filed by me April 23, 1923, Serial Number 634,111.

The present invention relates particularly to the drive connection between a pedal shaft provided on the scooter and the rear driven wheel, the general object of the invention being to provide a drive means improved in various particulars and having especially in view to provide a gear that will permit of coasting with the scooter. A further object is to produce an improved brake-operating means.

The nature of the present invention, its distinguishing features and advantages, will clearly appear as the description proceeds.

Reference is to be had to the accompanying drawings forming a part of this specification, it being understood that the drawings are merely illustrative of one example of the invention.

Figure 1 is a side elevation of a scooter embodying my invention;

Figure 2 is a sectional plan view, the section being indicated by the line 2—2, Figure 1;

Figure 3 is a front elevation showing the upper portion of a steering post and brake device, the construction and arrangement of which is the same as in my aforenamed application;

Figure 4 is a section on the line 4—4, Figure 3.

As in my previous invention a frame 10 is provided comprising longitudinal side bars convergent and forming jointly at the front end an upwardly extending head 11 in which the steering post is mounted as hereinafter described. Depending from the frame 10 are hangers 110 at opposite sides of the frame in which the axle 12 of the rear wheel 13 is mounted. On the frame 10 is a platform 14 on which the user of the scooter may stand on one foot. A pedal 15 is disposed at one side of the frame and is rigid with a shaft 16 which turns in hanger brackets 17 at the opposite sides of the frame 10.

Rigid on shaft 16 is a gear wheel 18 and rigid on the axle 12 of the rear wheel is a pinion 19, said gear wheel 18 and said pinion 19 meshing with an intermediate gear wheel 20 on a shaft 21 turning in a bearing in a depending bracket 22 on a side bar of the frame 10. Rigid also with the axle 12 to turn therewith and with the pinion 19 is an arm 23 which carries a pawl 24 at one side thereof, said pawl being secured to arm 23 by a pivot 25. The wheel 13 is loose on the axle 12 and rigid with said loose wheel 13 is a ratchet wheel 26 adapted to be engaged by the pawl 24. A depending bracket 27 on a side bar 10 has a bent lower end 28 constituting a stop for the pawl arm 23 when said pawl moves downwardly. Above the stop foot 28 a trip 29 depends from the frame 10, the lower end of said trip being oblique to a vertical line and being disposed in the path of the pawl 24 as the latter rises from the stop 28.

With the above described construction a depression of the pedal 15 will rock the shaft 16 forwardly and turn forwardly the gear wheel 18. Through the intermediate gear wheel 20 the pinion 19 will also be given a forward turning movement. At the same time the pawl arm 23 will swing forwardly through an arc and by its engagement with the ratchet wheel 26 will give a forward impulse to the rear wheel 13. The pawl arm has a movement from the stop 28 to a point slightly past the trip 29. The pedal shaft 16 is given a return movement by reason of a torsion spring 30 coiled about a drum 31 on said shaft 16. One end of the spring is made fast as at 32 to any suitable cross member indicated at 33 on the frame and the opposite end 34 of said spring is secured to the gear wheel 18, the arrangement being such that by a forward turning of the pedal shaft 16 the torsion spring 30 will be stressed and upon the foot being removed from the pedal 15, the spring 30 will restore the pedal and will turn the train of gear wheels thereby turning back the pawl arm 23 and pawl 24. The pawl 24 will then be arrested by foot 28 and will be caused to engage the ratchet wheel 26 to impart another forward impulse to the wheel 13 when the pedal 15 is again depressed and the pawl is thereby raised. Thus the pawl 24 is oscillated to move forward and back with the oscillation of pedal shaft 16 in the depression and rising of the pedal 15.

It will be readily understood that when the pawl 24 is in the raised position adjacent the trip 29 and said pawl out of engagement with the ratchet wheel 26, the scooter may be freely used for coasting.

The front wheel 37 is on an axle 38 in the front fork or steering post 39. The steering post 39 has rearwardly extending members 40 through which a pivot pin 41 extends, said pin extending through the front end of the head 11, thereby permitting said post 39 to be turned laterally through an arc with the pin 41 as a center. The upper end of the steering post 39 has cross handle bar 42. On the handle bar 42 are two cams 43 which turn with handle bar 42 in a forward or backward movement. Directly in contact with the two cams are the brake rods 48 extending downwardly and equipped with brake shoes at the lower ends. The brake shoes 49 are adapted to be applied by the turning of the handle bars 42 forward or backward. The cams 43 acting on rods 48 depress the brake shoes 49 at the ends of the brake rods against the drums 50 on the steering wheel 37. Normally, the brake shoes 49 are held raised and out of contact with the hub 50 by springs 51 coiled about the brake rods 48, the springs at the lower ends abutting against the fork 52 of steering post 39 and abutting at their upper ends against collars 53 on the brake rods 48.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. A scooter having a rear wheel and an axle therefor, a shaft, a pedal thereon, a drive element on said pedal shaft adapted to oscillate with the depression and rising of the pedal, a driven element on said axle adapted to be turned back and forth by said drive element with the oscillation of the pedal shaft, an oscillating pawl constrained to move with the back and forth movement of the said driven element, and a ratchet wheel connected to said wheel to turn the latter, said ratchet wheel adapted to be engaged by said pawl; together with means to trip said pawl to disengage it from the ratchet wheel after an impulse imparted to the ratchet wheel whereby to disengage the pawl from the ratchet wheel and permit use of the scooter in coasting, and means to cause engagement of the pawl with the ratchet wheel in the forward movement of the pawl.

2. In a scooter, an oscillating pedal-actuated drive shaft, a driven wheel and an axle therefor, a ratchet wheel connected to said driven wheel, a driven element loose on said axle and adapted to be turned back and forth by the oscillations of said shaft, an arm mounted loosely on said axle and constrained to move with said driven element, and a pawl carried by said arm and movable therewith to swing through an arc back and forth for actuating said ratchet wheel and return; together with means to trip said pawl and release it from the ratchet wheel after an actuating impulse, and means to cause said pawl to engage said ratchet wheel upon the pawl starting an actuating movement.

3. In a scooter, a pedal-actuated oscillating drive element, a driven wheel and an axle therefor, a ratchet wheel rigid with said driven wheel, a driven element adapted to be turned back and forth by the oscillation of said drive element, a pawl constrained to have oscillating movement with the turning back and forth of the driven element and adapted when moving in one direction to engage and actuate said ratchet wheel, means adapted to engage the pawl and cause engagement with the ratchet wheel at the limit of movement of the pawl in one direction, and a trip adapted to engage said pawl and release the same at the limit of movement of the pawl in the opposite direction.

4. In a scooter, a pedal-actuated drive element, a pedal shaft, a pedal thereon, said shaft adapted to be oscillated by the depression and rising of the pedal, a driven element on said shaft, a torsion spring coiled about the shaft and adapted to be stressed with the depression of the pedal for turning the shaft and the drive element in the opposite direction from a movement imparted by the depression of the pedal, a driven wheel, and means to impart forward impulses to said driven wheel by the oscillation of the drive element, and means to release the last-mentioned means upon the limit of the movement imparting an impulse to the driven wheel.

HARVEY O. WILSON.